Fig. 2

Patented May 27, 1930

1,760,185

UNITED STATES PATENT OFFICE

FORREST MASON ALDRICH AND CARL L. HANSEN, OF SEATTLE, WASHINGTON

DOUGH BRAKE

Application filed September 13, 1927. Serial No. 219,311.

Our invention relates to a process of making bakery goods and to the machine for carrying out said process. More particularly our invention relates to a dough brake which breaks, develops or kneads the dough after being mixed, and after being separated into the unit which constitutes the quantity of the dough in the article sold.

For purposes of clearness and definiteness of illustration, my invention will be described as applied to the breaking, developing or preparing of bread-dough, but it will be understood that it is not to be limited to any such specific application but is co-extensive in all fields where like conditions and like problems obtain, for example, it may be used as a dough molder.

Heretofore, the common practice is to mix the dough with a dough mixing machine and then to supply this dough in large quantities such as fifty to seventy-five pounds to a dough brake. After being broken by the dough brake machine, the dough is manually cut and weighed into separate units which represent the quantity of dough required for a loaf of a given size, and after being thus manually separated into units it is molded into the form constituting the loaf to go into the baking pans. Very serious objections obtain to this hand operation of scaling, not only because of its slowness which thereby increases the expense of manufacture, but especially does it interfere with the quality of the bread product. This arises by reason of the continued fermentation of that portion which is last scaled, i. e. it will be understood that the first unit which is separated is caused to pass between the rolls of the molder which presses it into a sheet form, from whence it passes to the curler that rolls it. After being molded it is then placed in pans and exposed to the proofer chamber to such a temperature as to cause the dough to rise to a pre-determined extent. While the first unit is going through these various steps, the remaining dough is continuing fermenting, which obviously produces a character of dough different from that represented by the first units that are separated. Thus, a product is produced lacking in uniformity, which constitutes a serious objection.

This method manifestly involves hand scaling or weighing, and this is further objectionable not only on account of its inaccuracy but when an extra piece of dough must be added it then becomes necessary that this be well worked into the mass constituting the unit to which it is applied, and it may be that this would cause a break in the surface of the dough which would appear in the final product.

A primary object of our invention is to provide a dough brake which overcomes all these objections.

Still another and more common practice, often referred to as the "old system", of developing dough in breadmaking, utilizes a machine, commonly known as "a divider", for separating the dough into individual units or loaves of standard weight. The dough having been separated into units is molded into a round form, after which it is then passed to a proofer in which the temperature is such as to cause the dough to rise to a predetermined extent. It will be noted that this method of preparing the dough does not involve any kneading or breaking the dough whatever but involves a very much prolonged process in that it requires time to allow the dough to rise after being somewhat reduced in size, which reduction is incident to its treatment such as going through the divider machine which separates it into units, and then again when the dough is caused to be molded.

Moreover, serious objection obtains to the bread made in this manner because it lacks fineness of texture and whiteness of color which is produced by a proper developing, breaking or kneading of the dough which is greatly preferred by the trade. Also, a serious objection obtains to this system which does not include breaking in that such method of treating the dough involves expensive machinery. There is included in such method the divider or scaler, the rounder machine which forms the loaf into a round form, then the proofer and finally the molder.

A primary object of our invention is to provide a dough-brake which kneads the dough after it is separated into the loaf units and molds the dough so that in the ordinary baking there is only necessary the divider (i. e. scaler) and the dough brake machine embodying our invention.

A further primary object of our invention is to provide a dough-brake which eliminates the hand scaling, and thereby greatly saves labor and time of manufacture. By providing for the breaking of the dough when it is divided and weighed into the size of the units in which it is sold, our invention provides for eliminating such "breaking" of the loaves as results from the addition of a small quantity of dough to make the quantity measure up to the required weight of the given unit. Our machine molds the dough immediately after being broken or kneaded which thereby eliminates all possibilities of new fermentation setting in. In this wise uniformity of quality is positively assured. This constitutes a very important feature of our invention. Furthermore, our invention is characterized by developing the dough without being handled by any operator, and, therefore, a sanitary product is provided.

The above mentioned general objects of our invention, together with others inherent in the same, are attained by the device illustrated in the following drawings, the same being a preferred exemplary form of embodiment of our invention, throughout which drawings like reference numerals indicate like parts.

A conveyor belt 6 is operatively mounted on rollers 7 and 8, roller 7 being driven. Sets of rollers 9, 10 and 11 are operatively disposed above said conveyor belt. Each of these sets of rollers is composed of the following parts: A roller 12 is mounted only slightly above the conveyor belt while a roller 13 preferably of the same size, is mounted at a greater distance above the conveyor belt for purposes hereinafter mentioned. Upright members 14 (Fig. 1) support a cross yoke 15 (Figs. 6 and 7) from which depend mounting members 16, which in turn support shaft 17 on which is hingedly mounted a curler 18 which may preferably be composed of sections 18, 20 and 21. Section 19 is yieldingly supported against roller 13 by means of spring 22, supported by bracket 23. Sections 20 and 21 of the curler are yieldingly supported by the arms 24 and 25, arm 24 being pivotally mounted on pin 26 and U form bracket 27 against which pin 26 bears. Arm 25 hooks over pin 28. The curler is provided with the separate section 21 in order that this may be folded down and not interfere with other parts of the device when the curler is moved to the elevated position shown in dotted line in order to clean thereunder. In elevated position the arm 24 is supported by bracket 84. A turner arm 29 projects across the belt 6. A knife 85 (Figs. 6 and 8) is adjustably mounted on arms 86 at each end thereof, said arms being mounted on pin 87 operatively disposed in slots 88 and 89. A second knife or scraper 90 functions to positively insure against the dough sticking to the roller after contacting the curler 18.

This combination of parts, that is, of rollers, curlers and turner arms, is provided in each set of rollers, 9, 10 and 11, with the exception that the turner arm is not provided for the set 11. (See Fig. 2.) This completes the description of the equipment in one longitudinal section of the device above the belt 6. As herein illustrated, there are five such sections, namely, 30, 31, 32, 33 and 34, with partitions 35, 36, 37 and 38 therebetween. These partitions are suspendedly mounted from cross yokes 15. (See Fig. 1.)

Figure 1:
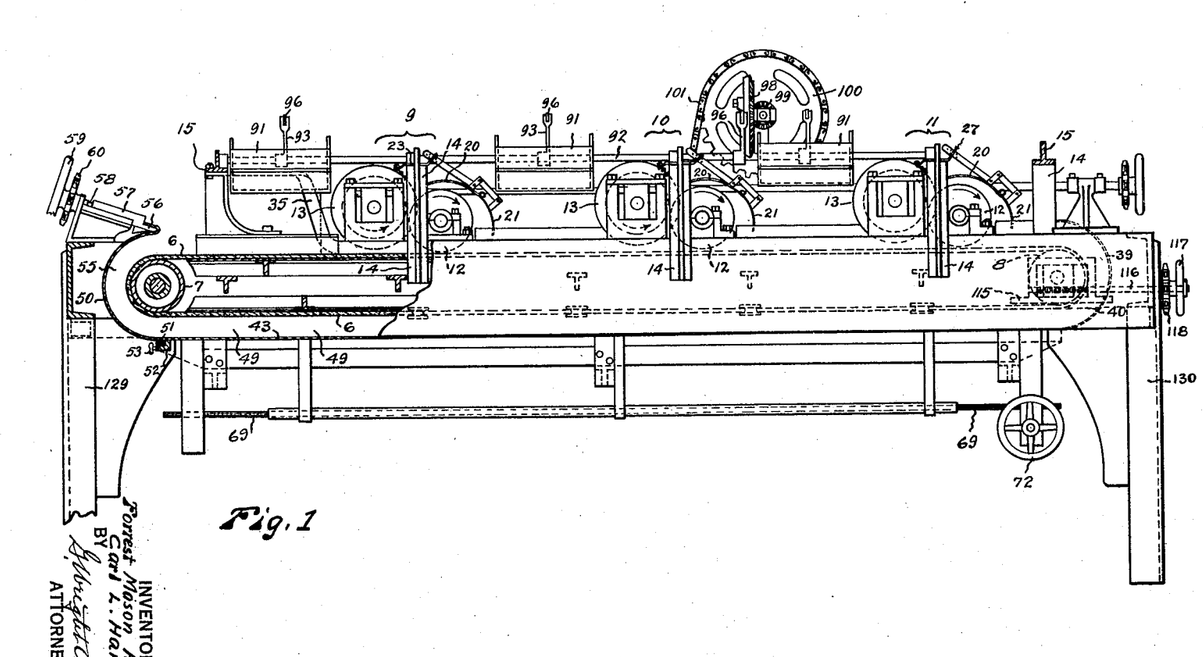
Figure 1 is a view in side elevation of a dough-brake embodying our invention with parts broken away.
Figure 2:
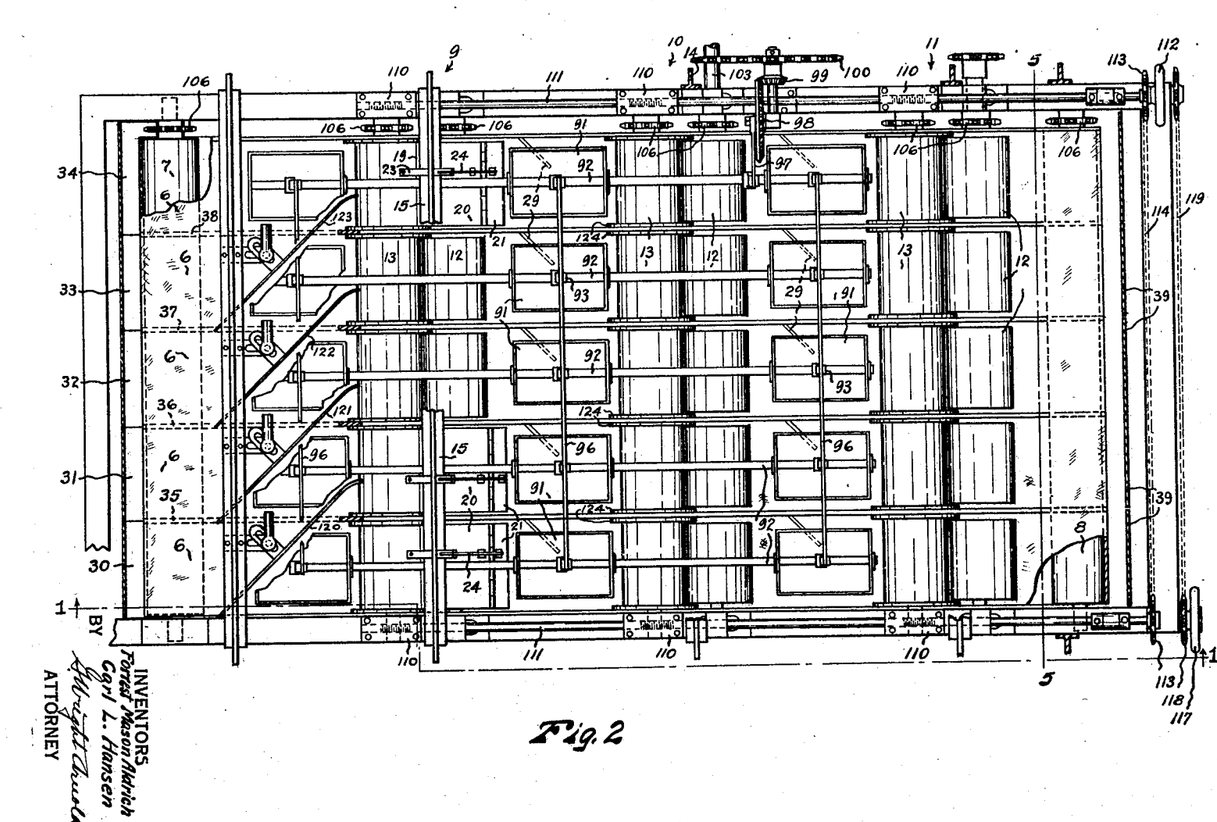
Fig. 2 is a plan view of the same.
Figure 5:
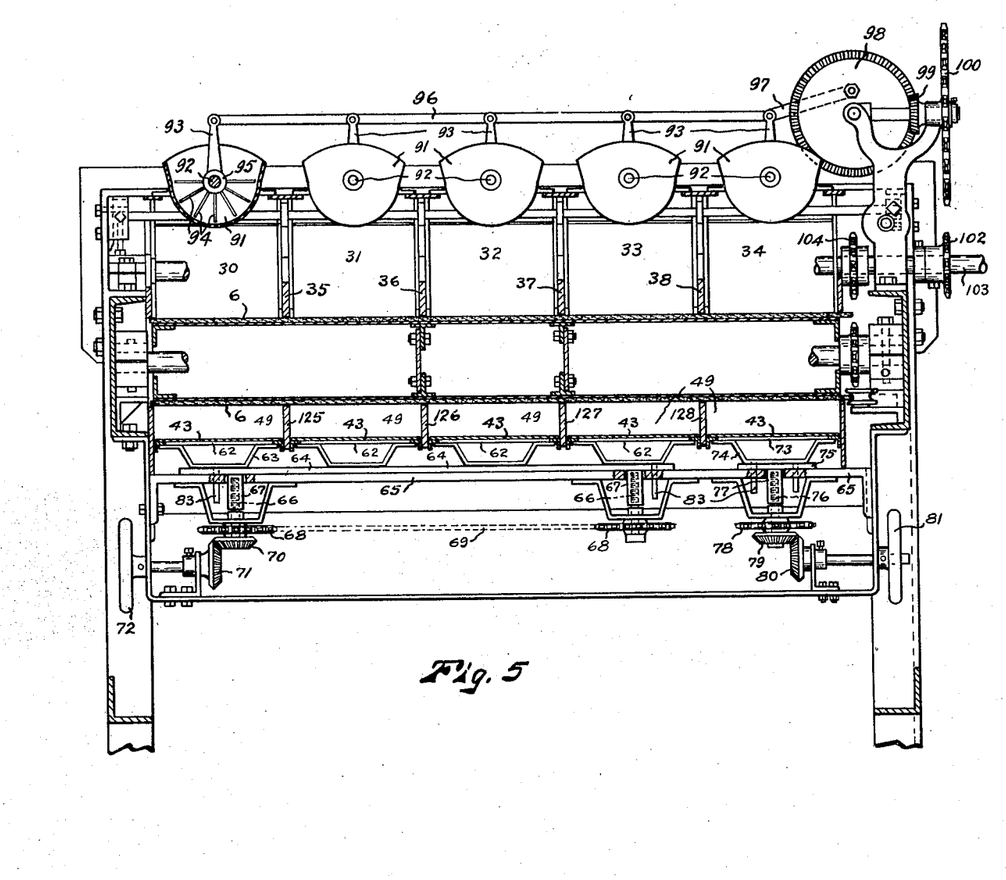
Fig. 5 is a view in cross section on dotted line 5, 5 of Fig. 2.

At the end of each of the sections there may be a curved turning plate 39. This plate is so disposed with respect to the belt 6 as it passes over the roller 8 that a slightly converging recess 40 results. This curved turning plate has a mounting block 41 secured at the lower end thereof which abuts against block 42 fixedly secured to the table 43, said latter block being provided with a thumbscrew 44 to hold securing plate 45 against blocks 41 and 42. Bottom partitions 125, 126, 127 and 128 (Fig. 5) corresponding to upper partitions 35, 36, 37 and 38, separate the sections over tables 43 so that the dough rolls, or loaves, are maintained separately during their return to the feed end of the machine. These bottom partitions are mounted on end frame supports 129 and 130. (Fig. 1). The upper part of the turning plate 39 is held in place by means of a thumbscrew 47 disposed in slot 48 in upper partition as 35, said screw holding one edge portion of turning plate 39 which is located in section 31 and so for each section the said thumbscrew does double duty in holding the plate 39 in adjacent sections;

each of the sections being provided with a detachably mounted turning plate 39.

Tables 43 for each section 30, 31, 32 and 33 and 34, extend throughout the length of the belt 6 and is in such spaced relation thereto as to form the compartment 49 which is of such depth as to permit the roll of dough to be rolled over the table by coming in contact with the moving belt which forms the ceiling of compartment 49. Thus, the dough is moved to the front or feeding end of the machine where it comes in contact with a curved elevating plate 50 (Figs. 1 and 3) which has a mounting means consisting of block 51 fixedly mounted on the end of plate 50 disposed to be held against block 52 fixedly secured to table 43 which has thumbscrew 53 which holds holding plate 54 which engages block 51.

Figures 3, 6, 7, 8:
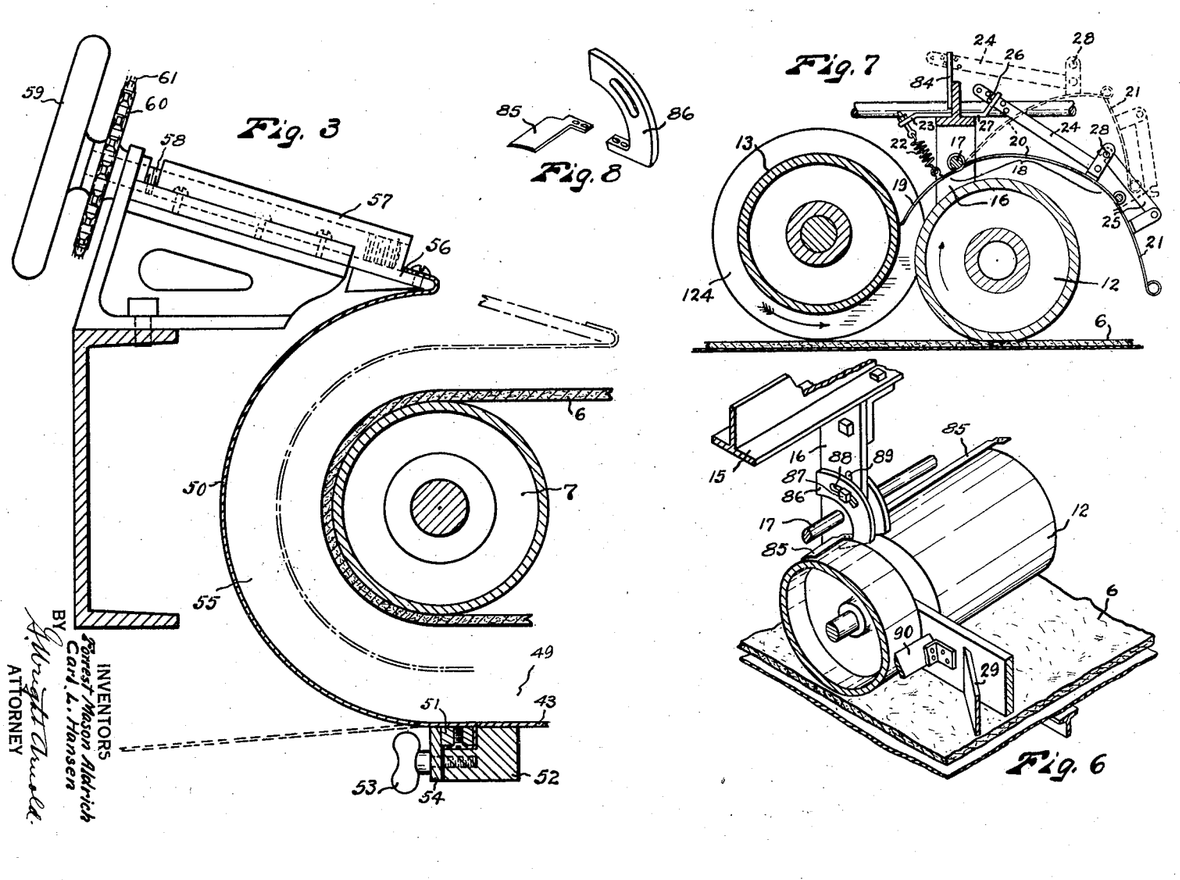
Fig. 3 is an enlarged view in section of the feed end of the machine.
Fig. 6 is a view in perspective of the dough roll and knife mounting means together with curler.
Fig. 7 is a further enlarged view in cross section of parts of said machine.
Fig. 8 is a view in perspective of the knife and knife adjusting bracket.

The curved elevating plate 50 is in spaced relation to the belt moving over roller 7 to form compartment 55 which is of equal width throughout, i. e., elevating plate 50 is substantially concentric with roller 7. The upper end of curved plate 50 as to its middle part is adjustably mounted by being secured in the end of a sliding member 56 which has a nut 57 in which is threadedly mounted adjusting screw 58, so that the upper end of the curved plate may be so held as to provide a substantial concentric compartment 55 with the roller 7 whereby the dough may be in contact with the belt until it is discharged above the roller. Adjusting screw 58 may be provided with a handwheel 59 and with a sprocket 60 over which sprocket chains 61 may pass to similar sprocket wheels mounted on similar screws engaging similar sliding members to which the middle of similar elevating plates in the other sections are mounted.

The table 43 is adjustably mounted as follows: Table 43 (Fig. 5) being individual for each section rests upon individual supporting members 62. These in turn rest upon yokes 63 and these are mounted upon elevating plates 64 which may support 4 of the members 63. The fifth yoke 63 is separately adjustable and will be described hereinafter. Elevating plate 64 normally rests upon fixed plate 65, to which is sub-tended jack-screws 66 which engage nut 67 which may be forced upwardly through an opening in plate 65 so as to elevate plate 64. Jackscrews 66 which are provided on each corner of plate 65 are provided also with sprocket wheels 68 over all of which passes a sprocket chain 69. A gear 70 is mounted upon one of the jackscrews 66, and this is engageable by gear 71 which is operatively connected to handwheel 72. Obviously turning handwheel 72 actuates the jackscrews simultaneously at all four corners of the plate 64 as sprocket chain 69 passes around and engages all four sprockets 68, so that plate 64 is carried upwardly or downwardly as the case may be thereby adjusting the height of the compartment 49.

Since the dough in the last section, namely, 34, will be given its final form, i. e., molded, it is desirable to have the adjustment of the height of the compartment 49 separately adjustable. Therefore, the table 43 has an individual supporting member 73, which is mounted on yoke 74 which is carried on elevating plate 75, which, in turn, normally rests upon fixed plate 65 (extending from side to side) to which is sub-tended the jackscrew 76 which has movable nut 77 mounted thereon which may be caused to engage elevating plate 75. Jackscrew 76 is provided with a sprocket wheel 78 and also with gear 79, which is engaged by gear 80 operatively connected to handwheel 81. A sprocket chain 82 connects a similarly mounted sprocket wheel 78 at the opposite end of the device so that turning handwheel 81 serves to simultaneously actuate the jackscrews 76 at each end of the device whereby the elevating plate 75 is moved upwardly or downwardly to properly adjust the table 43 thereabove as may be desired. Guide pins 83 serve to hold the elevating plate 75 in position.

Sifter pans 91 are longitudinally disposed above each section (see Figs. 2 and 5) intermediate the sets of rollers. Through the pans 91, shafts 92 extend throughout almost the length of the machine. Arms 93 are fixedly secured to said shafts. Paddles 94 are fixedly mounted on sleeves 95 which are fixedly secured to shafts 92. Said arms 93 are secured to link 96, which in turn is connected to link 97 which is excentrically mounted on gear 98. Gear 98 is engaged by gear 99 which may be driven by sprocket wheel 100, which, in turn, is connected by sprocket chain 101 (see Fig. 4) to sprocket 102 mounted on driving shaft 103. Also on driving shaft 103 is mounted sprocket 104 over which passes sprocket chain 105, which passes over idlers 106 to sprocket wheels 107 and 108 of each set of rollers 9, 10 and 11. Adjustably mounted idler 109 is provided to adjust the tension in the sprocket chain 105.

The upper roller 13 (Fig. 2) of each set of rollers 9, 10 and 11 is mounted in a journal box 110 threadedly secured to a shaft 111 which is provided with a handwheel 112 and a sprocket wheel 113 over which sprocket chain 114 passes to similar sprocket wheel on a shaft similar to 111 similarly mounted on the opposite side of the device so that both ends of the roller 13 are simultaneously adjustable with respect to the fixed roller 12.

The rollers (Fig. 1) upon which conveyor belt 6 is mounted is likewise adjustably mounted by means of a journal box 115, which is engaged by screw shaft 116, which has handwheel 117 and sprocket wheel 118 over which sprocket chain 119 passes to a similar sprocket wheel mounted on a similar screw on the opposite end of the device, so that both ends of the roller 8 may be adjusted to give the desired tension to the conveyor belt 6.

Guide members 120, 121, 122, and 123 (Fig. 2) are operatively disposed above the conveyor belt 6 across each section at the feed end of the device so that the dough rolls may be transferred from one section to the next upon its return to the feed end of the machine. The upper rolls 13 are provided with flanges 124 (see Fig. 2). Between these flanges roll 12 is disposed.

Figures 4, 9, 10:
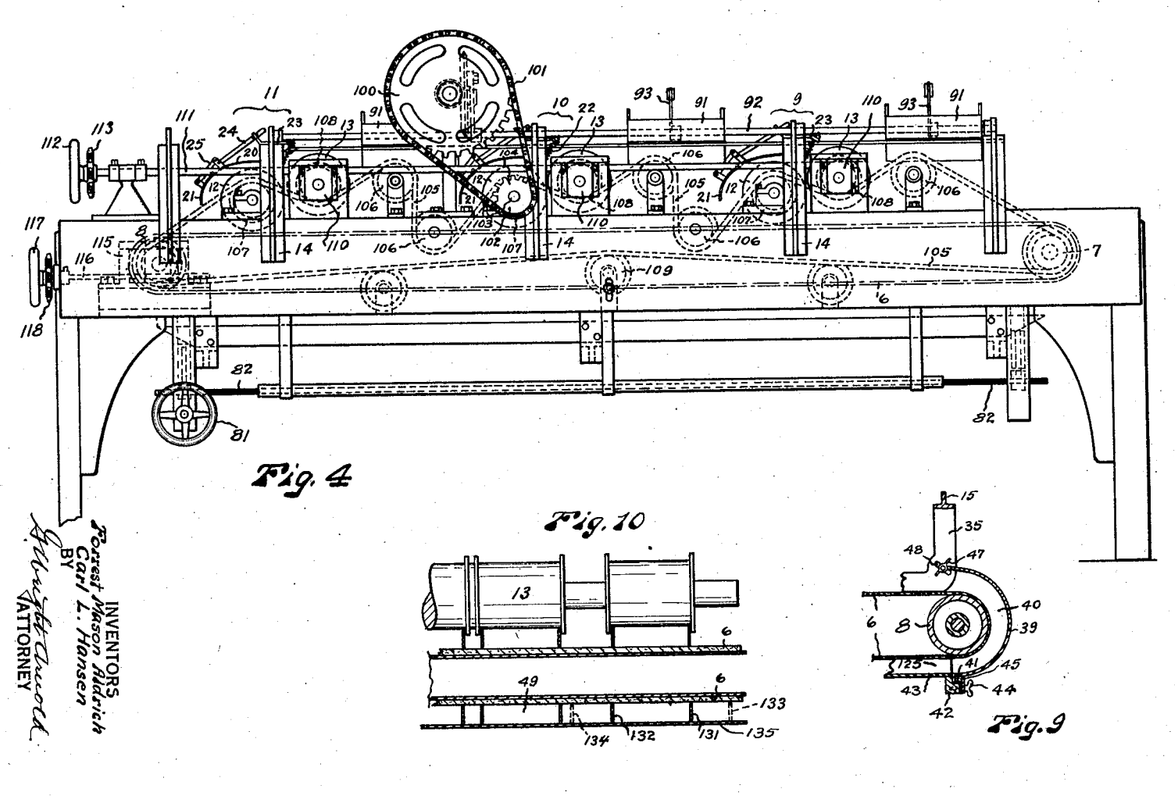
Fig. 4 is a view in elevation of the side opposite to that shown in Fig. 1, showing the driving mechanism.
Fig. 9 is a view in section of the turning plate at the return end of the machine.
Fig. 10 is a view in section of an end of a modified form of the last section of the device embodying our invention.

In the modified form of section 34 shown in Fig. 10, the partitions 131 and 132 are adjustably secured to members 129 and 130 so that they may be located in positions as shown in full lines in Fig. 10 when the normal size of loaf is desired or they may be located in position shown in dotted lines 133 and 134 when it is desired to make a longer loaf such as is commonly known as the pullman size. When this longer type of loaf is desired, a wider table than 43 is required and accordingly table 135 would be provided, i. e. table extending between partitions 131 and 132 in their dotted positions, 133 and 134.

The mode of operation of the device embodying my invention is as follows: The unit of dough previously weighed, i. e. scaled, in the form of an irregular lump to constitute the article to be sold, such as a loaf of bread, is supplied by any suitable conveyor means from the divider (not shown) to the conveyor belt in section 30 at a point immediately in front of the set of rollers 9. This dough is carried by the belt against roller 12 which revolves in the direction of the arrow, i. e., clockwise, or against the direction of the moving dough. This picks up or forces the dough against roll 13, (revolving in a counter-clockwise direction) so that it is rolled out into the form of a sheet between the two rollers and is carried against the knife 85.

This knife 85 detaches the dough from the roller 12 and the dough is then forced upwardly until it contacts the curler 18 which retards the advancing edge portion of the dough, and as more of the sheet of dough is forced upwardly it tends to roll and the front edge then falls back and downwardly upon the sheet of dough moving upwardly, and as more and more dough is forced upwardly, it is caused to assume a cylindrical roll or jelly cake form of roll. Thus, the dough is rolled upon itself, and is discharged upon the conveyor belt 6 in a position transverse of the belt. The roll then is carried against turning arm 29 which retards one end of the roll and causes the longitudinal axis of the roll to assume a position parallel to the longitudinal axis of the belt. Next, the dough is carried against the second set of rolls, i. e. 10, where it is picked up by the lower roller No. 12 and forced against upper roll 13 precisely as was done by the corresponding rolls in the first set 9. The dough then proceeds through the same process of being rolled into a sheet and curled upon itself again as occurred in the first set of rolls and co-operating curler and the same treatment occurs in the third set of rolls 11 after the roll of dough has been turned by the turning arm 29 disposed between the set of rolls Nos. 10 and 11. The roll of dough after being discharged upon the conveyor belt 6 is conveyed by the belt 6 to the table 43 and the space 49 between the belt and the table is adjusted to permit the belt to roll the dough over and over until it reaches the feeding end of the machine where the dough is then carried by the belt into the recess 55 which is so spaced as to keep the dough in continuous contact between the elevating plate 50 and the belt 6 so that the dough is carried to the top of the conveyor belt 6 and moved against guidearm 120 which causes the roll of dough to be transferred to section 31, wherein the dough roll proceeds through the same treatment in the sets of rollers 9, 10 and 11 as occurred in the corresponding sets in section 30. The same treatment occurs in section 32 and 33 and 34, the dough being returned from the discharge or return to the feeding end precisely as was described in connection with section 30. Upon being returned to the feeding end after being kneaded or broken by the rollers in section 34 it is discharged on to an inclined table, (not shown). After passing through the next set of rollers in section 34, the dough is returned over table 43 which is separately adjustable to mold the roll of dough to the required length desired for the baking pan. When it is desired to have an extra length loaf of the so-called pullman type the partitions 131 and 132 shown in the modified form shown in Fig. 10 may be disposed at a greater distance to each other and caused to take positions shown in dotted lines 133 and 134 and the wider table 135 inserted between said partitions.

Various adjustments have been described in connection with the description of the parts in question. From the flour sifting pans 91 the required amount of flour is supplied to the moving parts to keep the dough from sticking thereto.

It is obvious that the mode of operation of the machine embodying our invention imparts a homogeneous character to the dough. Thus, our device is characterized by its ability to handle the dough in small individual scaled units in large numbers without handling by an operator.

It will be understood that at the present time the dough where it is broken en masse must be scaled by hand thereafter to provide the separate individual scaled units. The mode of operation of our invention makes possible the scaling of the dough previous to the breaking, i. e., at a time when the scaling may be done to the best advantage and in the shortest possible time.

Likewise it will be manifest that all of the dough receives a uniform treatment in our invention, and, therefore, produces a product of uniform quality, i. e., the texture and grain of the bread is the same throughout, whereas, in the form heretofore in vogue the first loaf of bread treated is the best grade, and in the meantime fermentation is continuing in the mass of the dough awaiting to be divided up and scaled into separate units so that the fermentation process is carried to a degree that results in a very much less desirable product in the later units than is obtained in the first unit.

Obviously, changes may be made in the form, dimensions, and arrangements of the parts of our invention, without departing from the principle thereof, the above setting forth only a preferred form of embodiment.

We claim:

1. A machine of the character described, embodying an endless conveyor belt; longitudinally disposed partitions mounted immediately above said belt, which divide the top area of said belt into sections in which material to be operated upon may travel; a set of rolls in each section operatively disposed in spaced relation above said belt; a curler operatively mounted with respect to one of said rolls, whereby said material after being pressed into a sheet may be curled into a roll; material supporting means operatively disposed beneath and at each end of and in spaced relation to, said belt whereby said belt may cause said material to return to the feed end of said belt; and means to cause the material to be diverted into the sections successively, whereby the same material may be operated upon by the rolls in the different sections.

2. A machine of the character described, embodying an endless conveyor belt; longitudinally disposed partitions mounted immediately above said belt, which divide the top area of said belt into sections in which material to be operated upon may travel; a set of rolls in each section operatively disposed in spaced relation above said belt; a curler operatively mounted with respect to one of said rolls, whereby said material after being pressed into a sheet may be curled into a roll; an adjustable material supporting means operatively disposed beneath and at each end of and in spaced relation to said belt whereby said belt may cause said material to return to the feed end of said belt; and means to cause the material to be diverted into the sections successively, whereby the same material may be operated upon by the rolls in the different sections.

3. A machine of the character described, embodying an endless conveyor belt; a plurality of sets of rolls operatively disposed in spaced relation above said belt; a curler operatively mounted with respect to one of said rolls; material supporting means operatively disposed beneath and at each end of and in spaced relation to said belt whereby said belt may cause said material to return to the feed end of said belt; and means located at the feed end whereby said material may be diverted to another position on said belt, whereby the said material may be operated upon by a different set of rolls than in the first instance.

4. A machine of the character described, embodying an endless conveyor belt; longitudinally disposed partitions mounted immediately above said belt, which divide the top area of said belt into sections in which material to be operated upon may travel; a set of rolls in each section operatively disposed in spaced relation above said belt; a curler operatively mounted with respect to one of said rolls whereby said material after being pressed into a sheet may be curled into a roll; and material supporting means operatively disposed beneath, at each end of, and in spaced relation to, said belt whereby said belt may cause said material to return to the feed end of said belt; said supporting means having sections registering with the sections above said belt; and means to cause the material to be diverted into the sections successively, whereby the same material may be operated upon by the rolls in the different sections.

5. A machine of the character described, embodying an endless conveyor belt; longitudinally disposed partitions mounted immediately above said belt, which divide the top area of said belt into sections in which material to be operated upon may travel; a set of rolls in each section operatively disposed in spaced relation above said belt; a curler operatively mounted with respect to one of said rolls whereby said material after being pressed into a sheet may be curled into a roll; material supporting means operatively disposed beneath, and at each end of, and in spaced relation to, said belt whereby said belt may cause said material to return to the feed end of said belt, said supporting means having sections registering with the sections above said belt, the last of said supporting means sections being separately adjustable as to width whereby said section may mold said material into the form of unit desired; and means to cause the material to be diverted into the sections successively, whereby the same material may be operated upon by the rolls in the different sections.

6. In a device of the character described, the combination of an endless conveyor belt; an upper and lower roll horizontally mounted immediately above said belt and in close proximity to each other, whereby material may be conveyed by said belt against said lower roll and caused to be moved into contact with said upper roll, whereby said material may be picked up from said belt; and a curler operatively mounted with respect to the lower of said rolls.

7. In a device of the character described, the combination of an endless conveyor belt; an upper and lower roll horizontally mounted immediately above said belt and in close proximity to each other, whereby material may be conveyed by said belt against said lower roll and caused to be moved into contact with said upper roll, whereby said material may be picked up from said belt; and a curler mounted in spaced relation to said lower roll, said curler comprising a curved band approximately paralleling the upper periphery of the lower roll, whereby material to be operated upon may be lifted by said lower roll against the said upper roll and pressed into a sheet and the front edge caused to contact said curler, said front edge being thereby retarded, the sheet curled upon itself by the action of the lower roll, and redischarged by said lower roll upon said belt.

8. In a device of the character described, the combination of an upper and lower roll horizontally mounted, whereby material which is caused to contact the lower roll may be carried against said upper roll and pressed into a sheet; and a curler operatively mounted with respect to the lower of said rolls.

9. In a device of the character described, the combination of an upper and lower roll horizontally mounted, said upper roll having flanges on each end thereof and said lower roll operating for a portion of its circumference between said flanges, whereby material which is caused to contact the lower roll may be carried against said upper roll and pressed into a sheet; and a curler operatively mounted with respect to the lower of said rolls.

In witness whereof we hereunto subscribe our names this 5th day of Sept., A. D. 1927.

FORREST MASON ALDRICH.
CARL L. HANSEN.